H. HEY.
ABSORBER AND SEPARATOR FOR GASES AND VAPORS.
APPLICATION FILED JUNE 16, 1913.

1,080,445.

Patented Dec. 2, 1913.

2 SHEETS—SHEET 1.

Witnesses

Inventor,
Harry Hey,
by Wilkinson Fisher
& MacKaye
Attorneys.

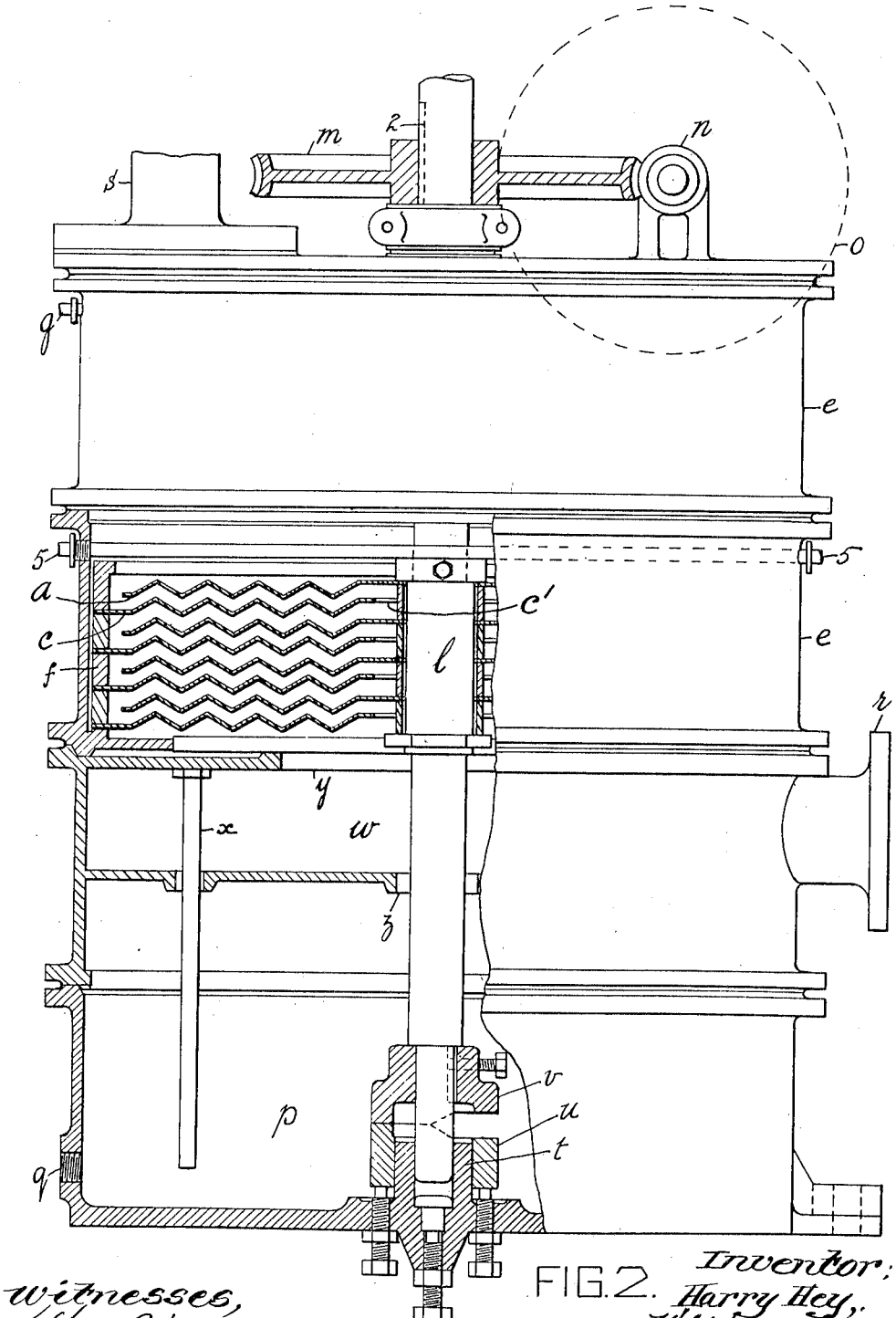

UNITED STATES PATENT OFFICE.

HARRY HEY, OF DEWSBURY, ENGLAND.

ABSORBER AND SEPARATOR FOR GASES AND VAPORS.

1,080,445.   Specification of Letters Patent.   Patented Dec. 2, 1913.

Application filed June 16, 1913. Serial No. 774,026.

*To all whom it may concern:*

Be it known that I, HARRY HEY, a subject of the King of Great Britain, residing at Dewsbury, Yorkshire, England, have invented certain new and useful Improvements in Absorbers and Separators for Gases and Vapors; and I do hereby declare the following to be a full, clear, and exact description of the invention, such as will enable others skilled in the art to which it appertains to make and use the same.

The present invention relates to improvements in absorbers and separators for vapors and gases of the type in which the vapors and gases are brought into contact with absorbent liquid which is caused to circulate through the apparatus in a direction contra to that in which the gases and vapors are circulated.

The object of the invention is to provide an absorber which shall be very efficient and which is so arranged as to cause the gases and vapors and the absorbent liquid to come into very intimate contact.

The invention will be best explained with reference to the accompanying drawings in which:—

Figure 1:
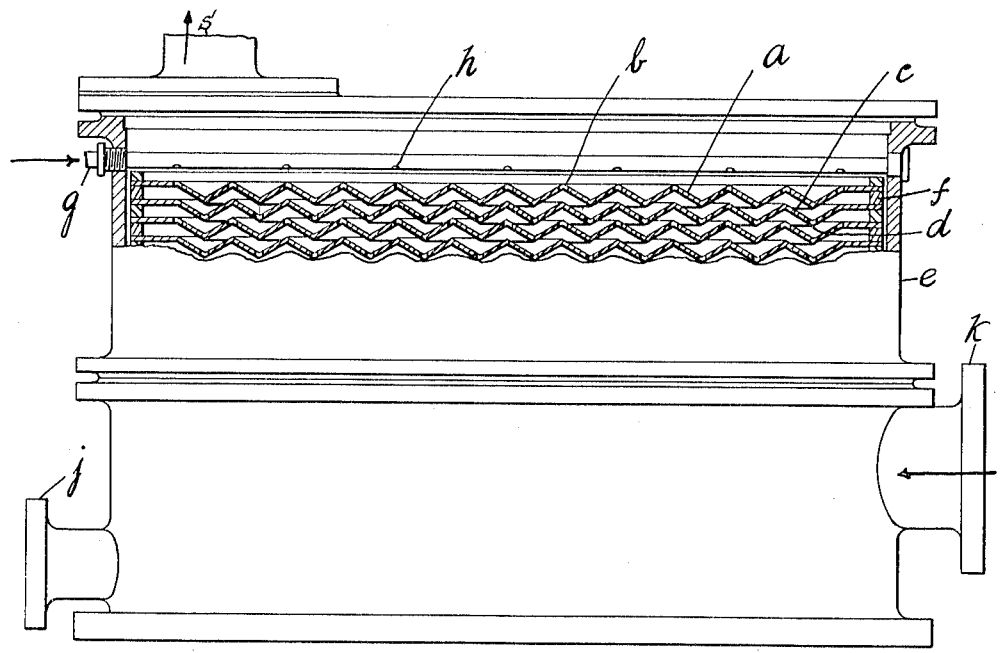
Figure 3:
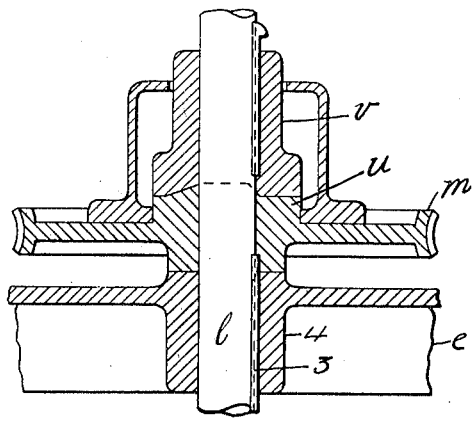

Figure 1 is an elevation in partial section of an absorber in accordance with the present invention. Fig. 2 is also an elevation in partial section showing various modifications, while Fig. 3 is a detail view hereinafter explained.

According to the present invention the vapors and gases are passed in one direction through the apparatus while the absorbent liquid is passed through the apparatus in the opposite direction. Both the vapors and gases and the absorbent liquid are caused to pass over and through corrugated plates which are so arranged that the depressions in one plate enter somewhat into the depressions in the plate immediately below so that a large number of small traps are made which hold the absorbent liquid through which the gases and vapors have to pass in their progress through the apparatus. By this means an absorber is formed which is more or less of the so-called "bubble scrubber" type in which owing to the arrangement of the corrugated plates the scrubbing effect on the gases and vapors is very greatly increased. Provision can also be made for rotating some of the plates relative to other of the plates to increase the scrubbing action while in addition those plates which are capable of rotation can be given a reciprocating motion in a direction at right angles to their planes so as to cause the pressures between adjacent plates to continually alter. This reciprocating motion also acts as a means for forcing the absorbent liquid down through the apparatus.

The application as herein described is primarily intended for use for the absorption of the vapors of volatile liquids, such as benzin used in dry cleaning, and the absorbent liquid in this case is oil. It is not to be understood, however, that the application is to be limited to the use of oil as the absorbent liquid, since it is obvious that the apparatus could be used for other purposes, such as the absorption of ammonia from air by means of water.

Referring now to Fig. 1 it will be seen that corrugated plates $a$ with concentric corrugations are arranged with orifices $b$ at the apices of the corrugations while immediately below each of the plates $a$ there is arranged a correspondingly corrugated plate $c$ with an orifice $d$ at the bottom of the depressions of the corrugations. These corrugated plates $a$ and $c$ are arranged in a suitable casing $e$ being held in their relative positions by spacing rings $f$. The absorbent liquid is forced into the apparatus by the pipe $g$ which is perforated at $h$. The outlet for the absorbent liquid and the gases which it has absorbed is shown at $j$. $k$ is an inlet for the gases and vapors and $s$ is the outlet for the same.

In working the absorbent liquid passing in by the pipe $g$ will pass through the holes $h$ and fall into the depressions in the corrugated plates $a$ and will gradually overflow by the orifices $b$ and fall down on to the plates $c$, through the orifices $d$ on to the next plate $a$ and so on while the gases and vapors will pass up in a contra direction and will have to pass through the orifices $b$ of the plates $a$ and through the liquid in the depressions in these plates $a$ and will pass up through the orifices $d$ in the plates $c$.

In the more complicated arrangement shown in Fig. 2 the plates $a$ are secured to a central shaft $l$ and are so arranged as to leave a free space between their outer peripheries and the spacing rings $f$ which support the other corrugated plates $c$ which latter have a central aperture $c^1$ so as to leave a space between their inner peripheries and the shaft l. The shaft l passes through the top of the casing e where it has secured to it a worm wheel m which is operated by a worm n rotated from a suitable pulley o. The casing e is formed with a well p for the absorbent liquid and has an outlet q. The casing e has also an intermediate chamber w through which the absorbent liquid passes by the pipe x or through the orifices y and z into the well p. This intermediate chamber w is provided with an inlet r for the gases and vapors which pass up through the orifice v and are caused to pass from the inner periphery of the plates c over the plates c and under the plates a until they pass up around the outer periphery of the plates a and under the plates c and so on up to the outlet s. The absorbent liquid is fed into the apparatus by any suitable pipe g. The lower end of the shaft l is located in a socket t about which socket there is arranged a circular inclined piece or cam u while there is arranged a correspondingly shaped circular piece or cam v secured to the shaft l. The shaft l is secured to the gear wheel m by a sliding keyway 2 so that on the shaft l being rotated the sliding of the part v over the part u will impart a reciprocating motion to the shaft in the direction of its length and so cause the corrugated plates a to be raised and lowered relative to the corrugated plates c, causing a continual decrease and increase in the pressures between these plates and causing a very intimate admixture of the absorbent liquid and the gases and at the same time forcing the absorbent liquid down over the plates. As the increased pressure at times between the plates may raise the temperature somewhat any suitable pipe 5 may be arranged for the circulation of cooling liquids. An additional effect is produced by the rotation of the shaft l in that it causes the rotation of the corrugated plates a relative to the corrugated plates c so that the bubbles of the gases and vapors which pass along the plates will tend to be attenuated and broken up so that the gases and vapors will be brought into still more intimate contact with the liquid.

The detail view shown in Fig. 3 indicates an arrangement whereby it is possible to cause the reciprocation of the shaft l in the direction of its length without causing the same to rotate. According to this arrangement the gear wheel m is rotatably mounted on the shaft l and on the upper surface of the boss is provided with the incline u while the shaft above this point carries a corresponding incline or cam v so that on the rotation of the gear wheel m the incline or cam u will raise the cam v and allow it to fall again in which movement this cam v will carry the shaft l which is prevented from rotating by sliding keyway 3 whereby it is connected to the boss 4 on the head of the casing.

What I claim is:—

1. In an absorber and separator for gases and vapors, a casing, superposed corrugated plates mounted in said casing with the depressions of one plate entering somewhat into the depressions of the plate immediately below and formed to permit the passage of fluids over and through them, spacing rings located between the adjacent plates, an inlet for the absorbent liquid consisting of a perforated pipe located over the corrugated plates, an outlet for the absorbent liquid and an inlet and outlet for the gases and vapors.

2. In an absorber and separator for gases and vapors, a casing, superposed corrugated plates mounted in said casing with the depressions of one plate entering somewhat into the depressions of the plate immediately below, a central shaft in said casing carrying alternate of said corrugated plates, means in the casing for carrying the other alternate plates, means for rotating said shaft together with the corrugated plates secured to it, an inlet and outlet for the gases and vapors and an inlet and outlet for the absorbent liquid.

3. In an absorber and separator for gases and vapors, a casing, superposed corrugated plates mounted in said casing with the depressions of one plate entering somewhat into the depressions of the plate immediately below, a central shaft in said casing carrying alternate of said corrugated plates, means in the casing for carrying the other alternate plates, means for rotating said shaft together with the corrugated plates secured to it, means for imparting a reciprocating motion to the said shaft in the direction of its length and to the corrugated plates secured to said shaft, an inlet and outlet for the gases and vapors and an inlet and outlet for the absorbent liquid.

4. In an absorber and separator for gases and vapors, a casing, superposed corrugated plates mounted in said casing with the depressions of one plate entering somewhat into the depressions of the plate immediately below, a central shaft in said casing carrying alternate of said corrugated plates, means in the casing for carrying the other alternate plates, means for imparting a reciprocating motion to the said shaft in the direction of its length and to the corrugated plates secured to said shaft, an inlet and outlet for the gases and vapors and an inlet and outlet for the absorbent liquid.

5. In an absorber and separator for gases and vapors, a casing, a central shaft in the said casing, corrugated plates secured to said shaft with their outer peripheries a short distance from the casing, further corrugated plates secured to said casing arranged with the angles of their corrugations in a vertical line with the angles of the corrugations of the first mentioned corrugated plates and with their inner peripheries a short distance from the said central shaft, said first mentioned corrugated plates alternating with said second mentioned corrugated plates, an inlet and outlet for the gases and vapors and an inlet and outlet for the absorbent liquid and means for rotating said shaft.

6. In an absorber and separator for gases and vapors, a casing, a central shaft in the said casing, corrugated plates secured to said shaft with their outer peripheries a short distance from the casing, further corrugated plates secured to said casing arranged with the angles of their corrugations in a vertical line with the angles of the corrugations of the first mentioned corrugated plates and with their inner peripheries a short distance from the said central shaft, said first mentioned corrugated plates alternating with said second mentioned corrugated plates, an inlet and outlet for the gases and vapors and an inlet and outlet for the absorbent liquid and means for imparting a reciprocating motion to said shaft in the direction of its length and to the corrugated plates secured thereto.

7. In an absorber and separator for gases and vapors, a casing, a central shaft, corrugated plates secured to said shaft with their inner peripheries a short distance from the said casing, further corrugated plates arranged one between each two of said first mentioned corrugated plates, said second mentioned corrugated plates being secured to said casing and arranged with their inner peripheries a short distance from the said shaft, the said corrugated plates of the first and second sets of corrugated plates being arranged with the depressions of one plate entering somewhat into the depressions of the plate immediately below, an inlet and outlet for the gases and vapors and an inlet and outlet for the absorbent liquid.

8. In an absorber and separator for gases and vapors, a casing, a central shaft projecting up through the top of said casing, corrugated plates secured to said shaft with their inner peripheries a short distance from the said casing, further corrugated plates arranged one between each two of said first mentioned corrugated plates, said second mentioned corrugated plates being secured to said casing and arranged with their inner peripheries a short distance from the said shaft, the said corrugated plates of the first and second sets of corrugated plates being arranged with the depressions of one plate entering somewhat into the depressions of the plate immediately below, a gear wheel secured to the part of said central shaft projecting through said casing, a gear engaging with said gear wheel and means for rotating said gear.

9. In an absorber and separator for gases and vapors, a casing, a central shaft projecting up through the top of said casing, corrugated plates secured to said shaft with their inner peripheries a short distance from the said casing, further corrugated plates arranged one between each two of said first mentioned corrugated plates, said second mentioned corrugated plates being secured to said casing and arranged with their inner peripheries a short distance from the said shaft, the said corrugated plates of the first and second sets of corrugated plates being arranged with the depressions of one plate entering somewhat into the depressions of the plate immediately below, a sliding keyway on the part of said shaft projecting above the casing, a gear wheel mounted on said shaft and connected thereto by said sliding keyway, means for driving said gear wheel, a socket embracing the bottom of said shaft, a circular incline or cam about said socket, a corresponding circular incline or cam mounted on said shaft, an inlet and outlet for the gases and vapors and an inlet and outlet for the absorbent liquid.

In testimony whereof, I affix my signature, in presence of two witnesses.

HARRY HEY.

Witnesses:
 HUBERT PUMPHREY,
 STEPHEN J. GORDON.